March 24, 1970 P. V. BATES 3,502,798

NETWORK FOR AUTOMATICALLY VARYING COLOUR TEMPERATURE BETWEEN MONOCHROME AND COLOUR RECEPTION IN A COLOUR TELEVISION RECEIVER

Filed March 27, 1967 2 Sheets-Sheet 1

INVENTOR
PAUL V. BATES

BY

PATENT AGENT

March 24, 1970 P. V. BATES 3,502,798

NETWORK FOR AUTOMATICALLY VARYING COLOUR TEMPERATURE BETWEEN MONOCHROME AND COLOUR RECEPTION IN A COLOUR TELEVISION RECEIVER

Filed March 27, 1967 2 Sheets-Sheet 2

INVENTOR.
PAUL V. BATES
BY
PATENT AGENT

United States Patent Office
3,502,798
Patented Mar. 24, 1970

3,502,798
NETWORK FOR AUTOMATICALLY VARYING COLOUR TEMPERATURE BETWEEN MONOCHROME AND COLOUR RECEPTION IN A COLOUR TELEVISION RECEIVER

Paul V. Bates, Waterloo, Ontario, Canada, assignor to Electrohome Limited, Kitchener, Ontario, Canada
Filed Mar. 27, 1967, Ser. No. 626,201
Int. Cl. H04n *5/44*
U.S. Cl. 178—5.4 10 Claims

ABSTRACT OF THE DISCLOSURE

Colour temperature is controlled automatically by a load resistor connected in the output circuit of the chrominance signal amplifier of a colour television receiver. This amplifier is turned on or off depending upon whether a colour or monochrome signal respectively is being received, so the voltage across the resistor varies with the type of signal being received. The resistor is connected to at least one of the electron guns of the picture tube to vary automatically the grid-cathode potential of this gun and hence colour temperature in response to changes in the voltage across the load resistor.

This invention relates to compatible colour television receivers. More particularly, this invention relates to networks for colour television receivers which operate to change colour temperature automatically depending upon whether a monochrome or a colour television signal is being received by the receiver.

It is well known that a reddish colour temperature is necessary to enable a colour television receiver to reproduce flesh tones and other shades of brown satisfactorily during reception of a colour television signal. On the other hand, reddish or cool colour temperatures are not satisfactory during reception of a monochrome (black and white) television signal. In order to reproduce monochrome signals satisfactorily, warmer temperatures of the order of say 9350° K. are required.

In recognition of the foregoing, a number of networks or devices have been provided for automatically changing colour temperature depending upon the type of television signal being received by a colour television receiver.

Thus, for example, it is well known to vary colour temperature automatically by the use of a relay operated indirectly by the colour burst signal that always is present in a colour television signal. The primary objections to a colour television receiver that employs a relay for this purpose are the cost of the relay, the audible "click" associated with relay operation, and relay unreliability. With regard to the last factor, as is well known, relays are subject to malfunctioning due to mechanical failure or corrosion.

It also is known to provide a simple picture tube electron gun grid bias control that is not automatic in nature and which must be operated manually to redden the raster for colour reception and to make the raster blue-white for monochrome reception.

In accordance with this invention, there are provided networks for automatically varying colour temperature which do not require the use of a relay and which are not subject to the problems inherent in a system employing a relay for this purpose. A network embodying this invention includes a load resistor in the output circuit of an amplifier for amplifying the chrominance signal of a conventional colour television signal. The chrominance signal amplifier is turned on automatically during colour reception and off automatically during monochrome reception, as is well known, so the voltage across the load resistor varies with the type of signal being received. The load resistor is connected to at least one of the electron guns of the picture tube to vary the grid-cathode potential difference of this gun in response to changes in the aforementioned voltage. In this manner colour temperature is controlled and automatically changes from one value to another when the signal being received changes from a monochrome television signal to a colour television signal and vice versa. Conventional circuitry may be employed for biasing the chrominance amplifier off during monochrome reception and on during colour reception.

This invention will become more apparent from the following detailed description, taken in conjunction with the appended drawings, in which.

Figure 1:
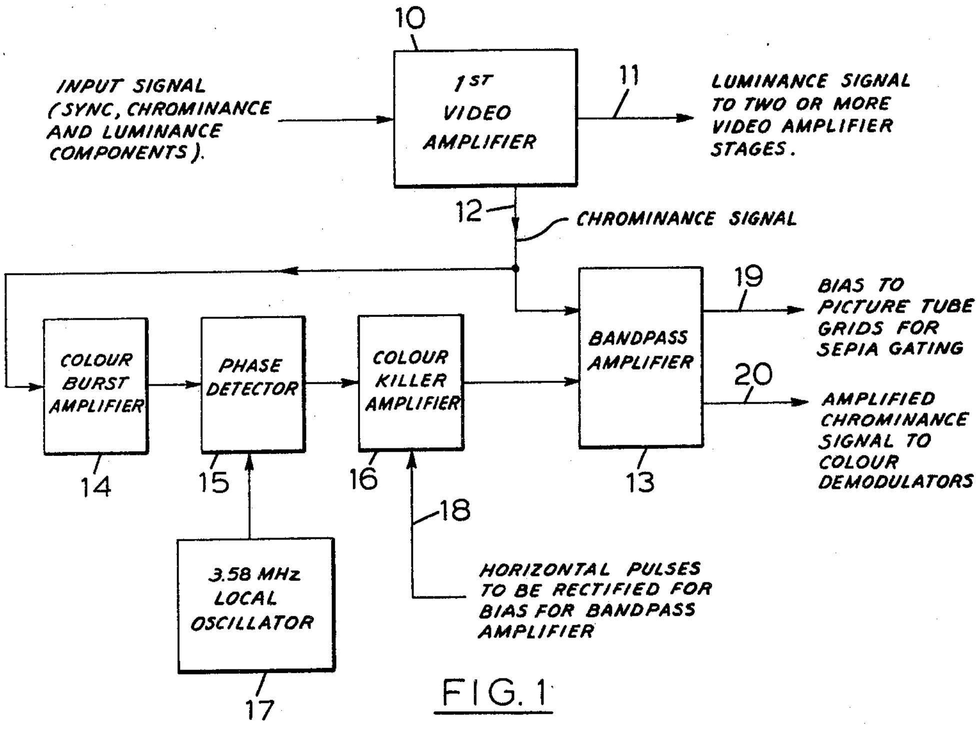
FIGURE 1 is a block diagram showing a part of a colour television receiver.

With reference to FIGURE 1, an input signal having sync, chrominance and luminance components is supplied to a video amplifier 10. This video amplifier may be conventional in nature and produces two output signals, one on line 11, and the other on line 12.

The signal on line 11 contains sync components and luminance components. This signal also may include substantial chrominance components, but these either are trapped subsequently or are not passed by subsequent video amplifiers to a greater or lesser degree. The sync signals are supplied to the sync separator (not shown) of the television receiver, while the luminance signal is supplied to two or more video amplifier stages and then to the cathodes of the three ("red," "green" and "blue") electron guns (not shown) of the colour picture tube (not shown) of the television receiver.

The signal on line 12 is shown as the chrominance (modulated subcarrier) signal. This signal is divided with a part being supplied to a bandpass or chrominance amplifier 13 and another part being supplied to a colour burst amplifier 14. The output signal from colour burst amplifier 14 is supplied to a phase detector 15 which supplies its output signal to a colour killer amplifier 16. A 3.58 mHz. signal is supplied to phase detector 15 from a local oscillator 17. Horizontal pulses that are clamped by colour killer amplifier 16 provide bias for bandpass amplifier 13 and are introduced into the system via a line 18. These horizontal pulses are derived from the horizontal output network (not shown) of the receiver. Two output signals are taken from bandpass amplifier 13 via lines 19 and 20. The signal on line 19 is supplied to a network embodying this invention, while the signal on line 20 is an amplified chrominance signal that is supplied to conventional colour demodulators.

Figure 2:
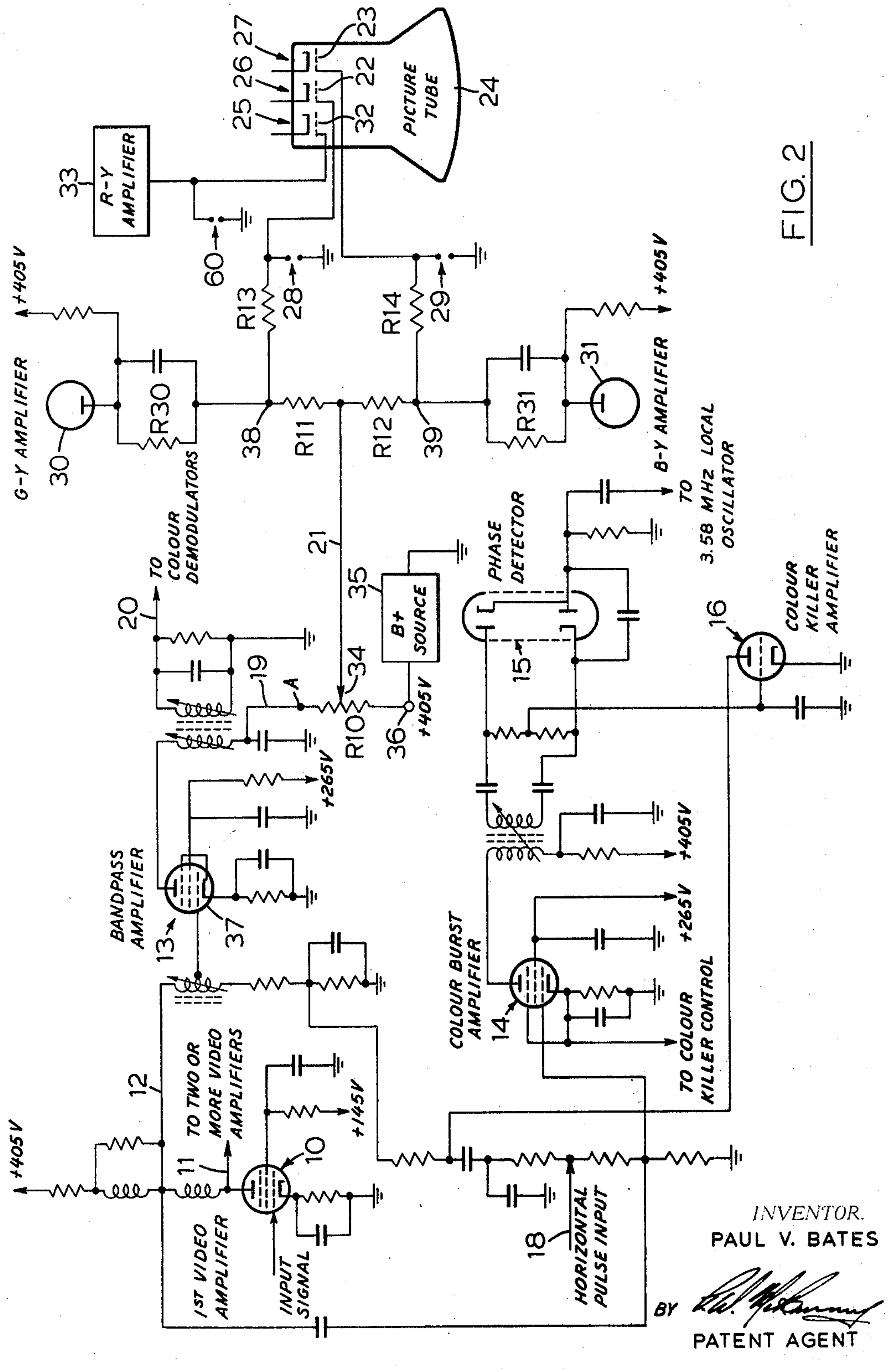
FIGURE 2 is a circuit diagram showing the system of FIGURE 1 in greater detail and a preferred embodiment of this invention.

Turning now to FIGURE 2, the various components shown in block form in FIGURE 1 are labelled in the same manner as in FIGURE 1. No detailed decription of the first video amplifier, colour burst amplifier, phase detector, colour killer amplifier and bandpass amplifier is required, since these components are conventional in nature, and their operation is well known in the art.

In accordance with a preferred embodiment of this invention, a line 21 from the load resistor R10 in the plate circuit of bandpass amplifier 10 is connected via attenuating resistors R11 and R12 and protection resistors R13 and R14 to the grid electrodes 22 and 23 of a colour picture tube 24 having a "red" gun 25, a "green" gun 26 and a "blue" gun 27. As is conventional, spark gap devices 28, 29 and 60 are connected between ground and the grid electrodes 22, 23 and 32 respectively for protection purposes.

A conventional $G-Y$ colour difference signal amplifier 30 supplies the $G-Y$ colour difference signal to grid electrode 22 via resistor R13, while a conventional $B-Y$ colour difference signal amplifier 31 supplies the $B-Y$ colour difference signal to grid electrode 23 via resistor R14. The $R-Y$ colour difference signal is supplied to grid electrode 32 of "red" gun 25 from a $R-Y$ colour difference signal amplifier 33 shown in block form.

Preferably resistor R10 is a potentiometer, as shown in FIGURE 2, since this provides a means whereby sepia may be controlled manually during reception of a colour television signal. This is not essential to the invention, however, and line 21 could be connected to point A, if desired, rather than to the slider 34 of potentiometer R10.

With reference to the specific connections shown in FIGURE 2, resistor R10 is in the output circuit of bandpass amplifier 13 being connected between the plate of electron discharge device 37 and a source 35 of direct current having a terminal 36 at a positive D.C. potential, which may be +405 volts, for example, relative to the potential of the cathode of electron discharge device 37. Slider 34 is connected to the common terminal of resistors R11 and R12, while the other terminals 38 and 39 of resistors R11 and R12 are connected via resistors R13 and R14 respectively to grid electrodes 22 and 23 respectively. The plate electrodes of the $G-Y$ and $B-Y$ amplifier tubes are connected to terminals 38 and 39 respectively via resistors R30 and R31 respectively.

In operation, during reception of a monochrome television signal, no colour burst is present in the signal supplied to video amplifier 10. Under these circumstances, there necessarily will be no colour burst present in the input signal to and hence no amplified colour burst output signal from colour burst amplifier 14. Therefore, no colour killer bias will be developed by phase detector 15. Colour killer amplifier 16 therefore will be turned on and will develop a bias that will cut off bandpass amplifier 13. This bias results from horizontal pulses from line 18 that are supplied to the colour killer amplifier 16 and clamped to provide the bias to cut off bandpass amplifier 13. Because bandpass amplifier 13 is cut off during reception of a monochrome signal, its plate voltage will be high. Consequently, the voltage on line 21 will be high, and grid electrodes 22 and 23 will be biased to a condition preset by the manufacturer of the receiver to optimize monochrome viewing, in other words, to produce a warm or bluish-white raster. Amplifiers 30, 31 and 33 are on during both colour and monochrome reception, and, during monochrome reception, the plate voltages of these amplifiers are of most significance in determining the grid voltages of electron guns 26, 27 and 25 respectively. In this respect, resistors R11 and R12 are large compared to the resistance of resistors R30 and R31 respectively in the plate circuits of amplifiers 30 and 31 respectively. Consequently, most of the potential difference betwen the voltage on line 21 and the voltage at the plate electrodes of amplifiers 30 and 31 will appear across resistors R11 and R12 respectively. In any event, the bias voltage appearing at grid electrodes 22 and 23 during monochrome reception is predictable, and this voltage is such as to optimize monochrome viewing. Since resistors R11 and R12 also are large relative to resistor R10, during monocrome reception essentially the same colour temperature will result regardless of the position of slider 34 of potentiometer R10.

When a colour burst is present in the signal supplied to video amplifier 10, colour killer bias will be developed by phase detector 15, and this bias, amplified and reversed in phase by colour killer amplifier 16, will be supplied to bandpass amplifier 13 to turn the bandpass amplifier on. With respect to the foregoing, it will be understood that colour burst amplifier 14 is keyed on by the horizontal pulses on line 18. These pulses correspond in time to the colour burst signals, so that if, when amplifier 14 is keyed on, a 3.58 mHz. colour burst signal also is present, this signal will be amplified by amplifier 14. This amplified signal is coupled from the plate circuit of amplifier 14 into the phase detector network. When bandpass amplifier 13 is turned on, the plate voltage of the amplifier will drop appreciably, so that the voltage on line 21 may change from +405 volts for monochrome reception to of the order of 150 volts during colour reception. This will cause an appreciable change in the bias voltages for grid electrodes 22 and 23 in a direction that automatically will give the reddish raster desired during colour reception. In this respect, during monochrome reception the plate voltages of amplifiers 30 and 31 are primarily responsible for determining the bias voltages for grid electrodes 22 and 23, and these bias voltages may be of the order of +200 volts. However, during colour reception, these grid bias voltages will decrease on account of the voltage on line 21 dropping from +405 volts for monochrome reception to +150 volts for colour reception. Resistor R10 should be relatively large to ensure a sufficient voltage drop between terminal 36 and slider 34 that the desired reddish raster is obtained.

If R10 is a potentiometer as shown in FIGURE 2, the position of slider 34 of the potentiometer may be varied for sepia control, this sepia control being effective only during colour reception. This is a preferred form of the invention because it results in one of the components of the automatic colour temperature control network also being a manual sepia control.

Resistors R11 and R12 serve to attenuate the voltage swing at slider 34 of potentiometer R10 when bandpass amplifier 13 is biased on during reception of a colour television signal. By way of example, the following components may have the values indicated:

R10—100KΩ
R11—1.5MΩ
R12—1.5MΩ
R30 and R31—100KΩ

Figure 3:
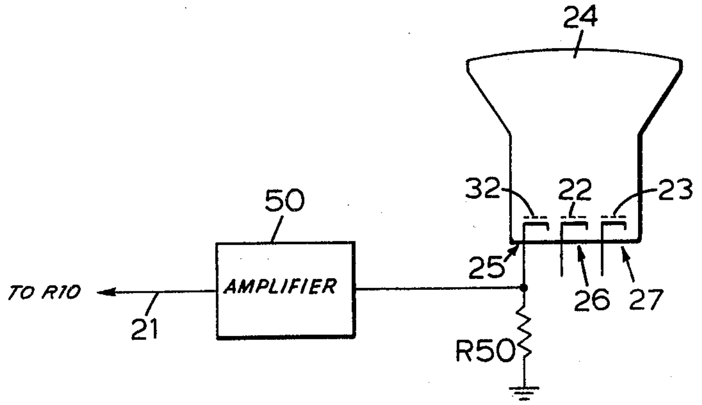
FIGURE 3 shows an alternative network embodying this invention.

A less preferred embodiment of this invention is shown in FIGURE 3. In this case, line 21 is connected to the first stage of an amplifier 50 that does not invert phase. The output of the amplifier 50 is developed across a resistor R50 connected between ground and the cathode of "red" gun 25. An amplifier 50 is required for impedance matching. During monochrome reception, the potential of the cathode of "red" gun 25 will be relatively high. However, during colour reception, the voltage on line 21 will drop in the manner hereinbefore explained, causing a decrease in the potential of the cathode of "red" gun 25, i.e., a decrease in the potential difference between the cathode and grid electrodes of "red" gun 25, whereby colour temperature automatically will become cooler.

In United States Patent No. 3,180,928 issued Apr. 27, 1965, J. L. Rennick, Colour Television Apparatus and Circuits Therefor, it is pointed out that the luminance signal may be applied to the grid electrodes of the three electron guns of a colour picture tube with the colour difference signals being applied to the cathodes of the electron guns. This invention may be utilized in such a system, as well as in the system of FIGURE 2. It also may be used in a system where the colour difference signals and luminance signal are matrixed ahead of the picture tube leaving simply pure colour signals +R, +G and +B or —R, —G and —B to be applied to the grid or cathode electrodes of the electron guns.

This invention also may be practised by connecting line 21 to the cathodes of the "blue" and "green" guns in such a manner that the potentials of these cathodes increase (grid-cathode potential differences increase) during colour reception, or by connecting line 21 to the grid electrode of the "red" gun in such a manner that the potential of this grid electrode increases (grid-cathode potential difference decreases) during colour reception.

While preferred embodiments of this invention have been disclosed herein, those skilled in the art will appreciate that changes and modifications may be made therein without departing from the spirit and scope of this invention as defined in the appended claims.

What I claim as my invention is:

1. In a receiver for reproducing monochrome and colour images of televised scenes of a type comprising a first amplifier for amplifying the chrominance (modulated subcarrier) signal of a colour television signal having chrominance and luminance signal components, said first amplifier having an output circuit, means for automatically turning on said first amplifier during reception of a colour television signal and turning off said first amplifier during reception of a monochrome television signal, a picture tube having "red," "green" and "blue" electron guns each including a cathode and control grid electrode, and means for automatically changing the voltage differential between said cathode and control grid electrodes of at least one of said electron guns when the signal being received by said receiver changes between a monochrome television signal and colour television signal to automatically vary the colour temperature of the image reproduced on said picture tube; the improvement wherein said last-mentioned means include a load resistor in said output circuit of said first amplifier and across which there is voltage that varies dependent upon whether said first amplifier is turned on or off, and means connecting said resistor and at least one of said electron guns to vary the grid-cathode potential difference of said one electron gun in response to changes in said voltage.

2. The invention according to claim 1 wherein said load resistor is a potentiometer.

3. The invention according to claim 1 wherein said means connecting said resistor and at least one of said electron guns consist of means connecting said resistor and said "blue" and "green" electron guns.

4. The invention according to claim 1 wherein said means connecting said resistor and at least one of said electron guns consist of means connecting said resistor and said grid electrodes of said "blue" and "green" electron guns.

5. The invention according to claim 1 wherein said means connecting said resistor and at least one of said electron guns consist of means connecting said resistor and said grid electrodes of said "blue" and "green" electron guns, said means connecting said resistor and said grid electrodes of said "blue" and "green" electron guns including a first attenuating resistor connected between said output circuit and said grid electrode of said "green" electron gun and a second attenuating resistor connected between said output circuit and said grid electrode of said "blue" electron gun, said receiver further including a third resistor, a green colour difference signal amplifier connected via said third resistor to apply a green colour difference signal to said grid electrode of said "green" electron gun at a point between said first attenuating resistor and said grid electrode of said "green" electron gun a fourth resistor, and a blue colour difference signal amplifier connected via said fourth resistor to apply a blue colour difference signal to said grid electrode of said "blue" electron gun at a point between said second attenuating resistor and said grid electrode of said "blue" electron gun, the resistance of said first and second attenuating resistors being large compared to the resistance of said third and fourth resistors respectively.

6. The invention according to claim 5 including a source of direct current having a terminal at a positive D.C. potential, and wherein said first amplifier is an electron discharge device having plate, cathode and control grid electrodes, the potential of said cathode of said first amplifier being negative with respect to the potential at said terminal, said load resistor being connected between said terminal and said plate electrode.

7. The invention according to claim 5 wherein said load resistor is a potentiometer and the resistance of each of said first and second resistors is large compared to the resistance of said load resistor.

8. The invention according to claim 1 wherein said means connecting said resistor and at least one of said electron guns consist of means connecting said resistor and said "red" electron gun.

9. The invention according to claim 1 wherein said means connecting said resistor and at least one of said electron guns consist of means connecting said resistor and said cathode of said "red" electron gun.

10. The invention according to claim 9 wherein said means connecting said resistor and said cathode of said "red" electron gun include an amplifier.

References Cited

UNITED STATES PATENTS

| | | | |
|---|---|---|---|
| 2,954,426 | 9/1960 | Kroger | 178—5.4 |
| 3,135,824 | 6/1964 | Boothroyd | 178—5.4 |

ROBERT L. GRIFFIN, Primary Examiner

RICHARD MURRAY, Assistant Examiner